United States Patent [19]

Hirs

[11] 3,814,247

[45] June 4, 1974

[54] METHOD OF FILTERING

[75] Inventor: Gene Hirs, Birmingham, Mich.

[73] Assignee: Hydromation Filter Company, Livonia, Mich.

[22] Filed: Aug. 21, 1972

[21] Appl. No.: 282,520

[52] U.S. Cl.............. 210/80, 210/82, 210/279, 210/290
[51] Int. Cl............................................ B01d 41/02
[58] Field of Search ............... 210/80, 275, 279, 290

[56] References Cited
UNITED STATES PATENTS

| | | | |
|---|---|---|---|
| 2,723,761 | 11/1955 | Van Der Made et al........... | 210/196 |
| 2,773,829 | 12/1956 | Hunting ............................... | 210/35 |
| 3,276,585 | 10/1966 | Kalinske .............................. | 210/80 |
| 3,436,260 | 4/1969 | Duff .................................... | 210/290 X |
| 3,550,774 | 12/1970 | Hirs et al. .......................... | 210/80 X |

FOREIGN PATENTS OR APPLICATIONS 932,537  7/1963  Great Britain ..................... 210/290

Primary Examiner—Samih N. Zaharna
Assistant Examiner—Robert G. Mukai
Attorney, Agent, or Firm—Cullen, Settle, Sloman & Cantor

[57] ABSTRACT

A liquid filtering method for operating an apparatus comprising a deep bed of dual, vertically separate, granular filter media beds. The first filter media bed has relatively coarse grains - being in the size range of 0.050 to 0.375 inches — which have a specific gravity in the range of 0.9 to 1.6. The second filter media bed, which underlies the first bed, has finer grains which have a specific gravity greater than 2.1. Upon backwashing, the first bed is slurried and turbulently recirculated through a path external of the retaining vessel, while the second bed is only expanded. After backwashing, the filter media beds assume their original respective orientations.

1 Claim, 4 Drawing Figures

METHOD OF FILTERING

CROSS REFERENCE TO RELATED APPLICATION

This application includes subject matter generally related to that disclosed in the applicant's Ser. No. 282,518 for U.S. patent, filed Aug. 21, 1972.

BACKGROUND OF INVENTION

Filtration through a bed of granular filter media to remove particulate contaminants from a liquid is most efficiently accomplished by forming the filter bed into gradations of larger to smaller granular filter media in the direction of filtration flow. This large-to-small gradation allows surface loading contaminants — fibrous and lint-like material, flakes, hydroxides, greases and oils and the like — to penetrate the surface of the filter bed to become entrapped within the interstices of the relatively large filter media. Thus, surface loading is avoided. The smaller particulate contaminants pass through the bed of large media and are entrapped by the filter bed comprised of finer granules. This type of filter is disclosed in U.S. Pat. No. 3,276,585.

Absent such a gradation, in-depth filtration utilizing a uniformly mixed filter bed of fine and large granules would experience very short filtration cycles. The fibrous and lint-like particulates and other surface loading contaminants would quickly blind off the surface of such a filter bed minimizing or eliminating the efficiencies of in-depth filtration.

However, simply forming a graded bed of filter media as called for above is not the total answer to the problems encountered in repeated operations. If a bed of filter media, graded from large to small granules, is comprised of material of a uniform specific gravity, backwashing of the filter bed after a filtration cycle will either uniformly mix the various sized filter media, or if the backwashing is turbulent, will cause the filter media to become graded and classified in an order of fine to coarse media, which is precisely the reverse of the desired order of gradation.

To overcome the difficulties encountered in utilizing filter media of a uniform specific gravity, numerous mixed-media in-depth filtration methods and apparatus have been proposed and patented. The larger granule filter bed of a mixed-media filter has a specific gravity which is less than that of the finer granule filter media. Differentials in the specific gravity of the filter media permit the desired gradation to be maintained after numerous backwashing cycles. Upon completing a backwashing cycle, the finer material will settle first followed by less rapid settling of the coarser material with its lesser specific gravity. Generally, such mixed-media in-depth filters utilize anthracite for the coarse grained filter media and sand for the finer filter media. Other combinations have also been proposed, e.g., sand and garnet, slag and sand.

To properly separate surface loading contaminants from the larger granular filter media in mixed-media filters, it is necessary to agitate and slurry the larger filter media in a turbulent manner. A critical limitation of previous mixed-media in-depth filters, including that disclosed in U.S. Pat. No. 3,276,585, is the absence of a turbulent or violent backwash of the larger filter media. The mere expansion of the typical mixed-media deep bed filter upon backwash is not sufficient to adequately discharge or separate the contaminants from the larger filter media.

A prime object of the present invention is to provide a mixed-media deep bed filter method which adequately separates entrapped contaminants from the coarse grain filter media and which operates efficiently after repeated backwashing.

BRIEF DESCRIPTION OF INVENTION

The present invention proposed to overcome the difficulties encountered with conventional mixed-media in-depth filter apparatus by utilizing a dual media filter bed of uncommon combination, graded or classified from coarser to finer media as in a conventional filter. The finer filter media can consist of any standard material such as sand, garnet, slag, or the like provided the specific gravity of the media is greater than 2.1. The larger granule filter media is any material with a specific gravity of between 0.9 to 1.6 which exhibits adequate filtration properties and which is tough and resilient, such as polyvinyl chloride, polyethylene, or polypropylene. Upon backwashing of the filter media bed, the finer and heavier material is expanded in a conventional manner, while the larger lighter filter media is expanded and slurried in a turbulent manner through a recirculating path at least a part of which is external of the filter media vessel. This produces an effect which dislodges entrapped surface loading contaminants from the coarse grained media and allows the filter bed to reform after backwashing to its original large-to-small gradation after backwashing.

AS SHOWN ON THE DRAWINGS

Figure 1:
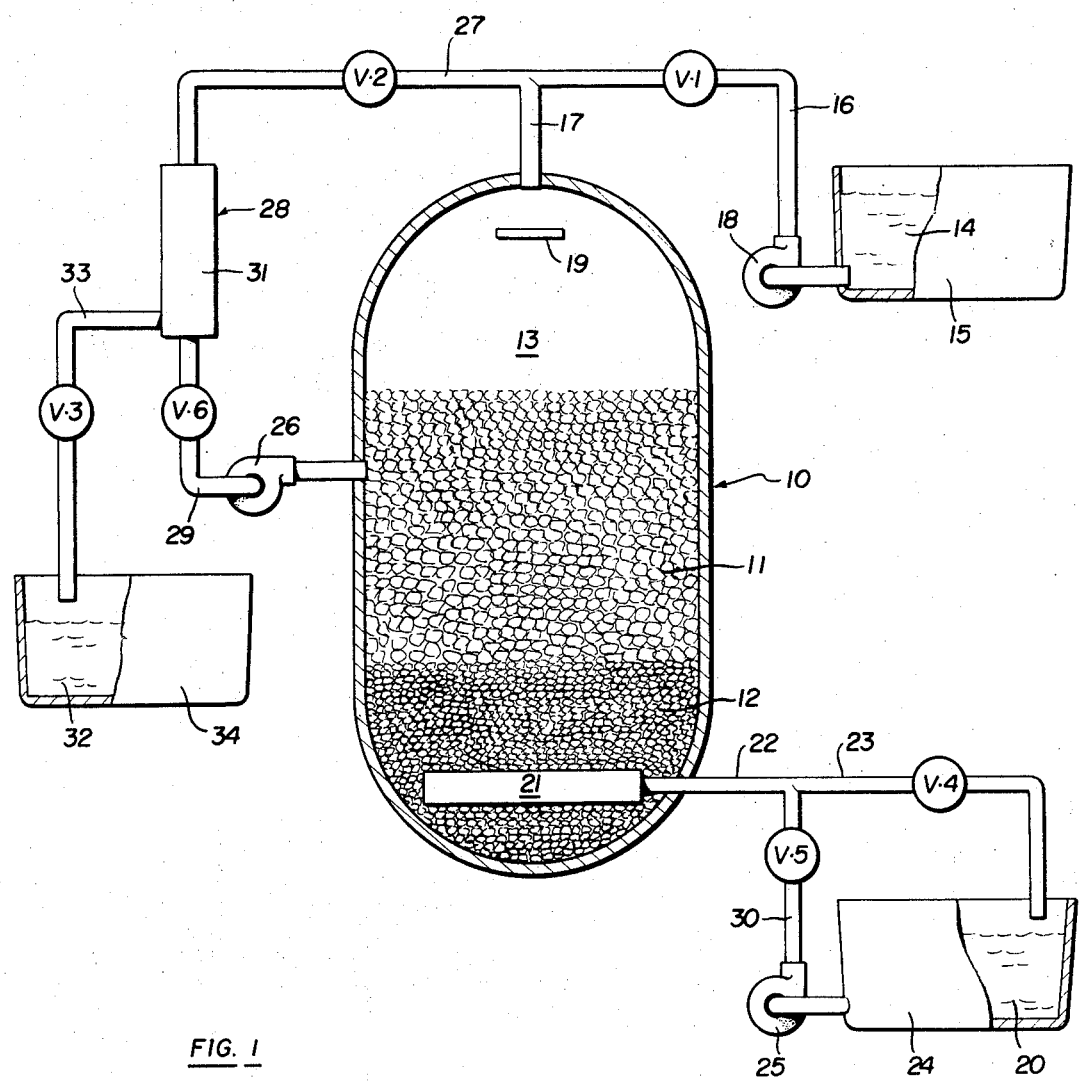
FIG. 1 is an elevational, cross-sectional view of a schematic representation of a filter of the present invention capable of carrying out the method of the present invention.
Figure 3:
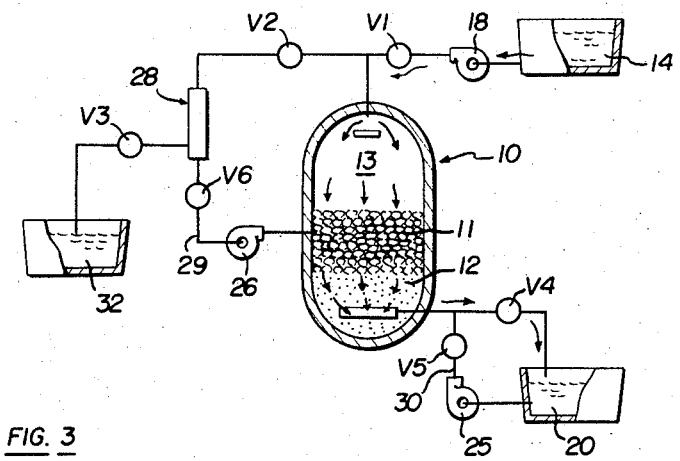
FIGS. 3 and 4 are simplified elevational, crosssectional, schematic views of the present invention in its preferred embodiment of FIG. 1 showing liquid flow paths during filtration and backwash and slurry, respectively.
Figure 4:
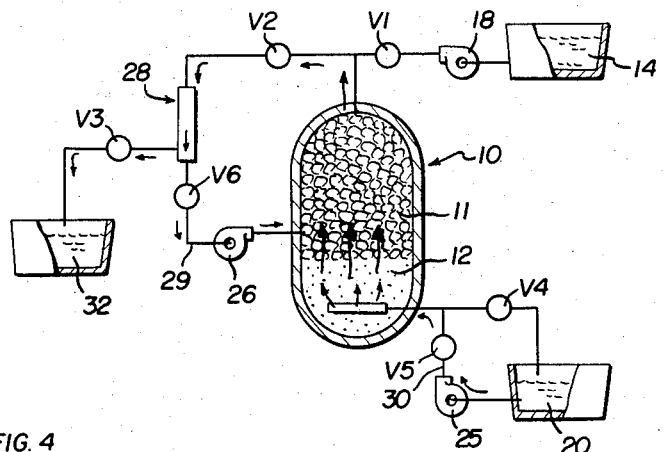

As shown in FIGS. 1, 3 and 4, pressure vessel 10 houses two distinct, virtually adjacent beds of filter media 11 and 12. The lower filter media bed 12 is comprised of any relatively fine granular material having a specific gravity greater than 2.1 and exhibiting ordinary filtration qualities. In its preferred embodiment filter media bed 12 consists of washed sand having a specific gravity of 2.74. Other acceptable materials include garnet, sand, and crushed gravel. The grain size of the material should be fairly uniform so as to avoid an accumulation of finer granules at the face of filter bed 12 after repeated backwashings. An accumulation of this sort would reduce penetration of contaminants into the bed and also reduce filtration cycle time.

The upper filter media 11 is comprised of relatively large granules falling into the size range of from 0.050 inches to 0.375 inches, with the preferred size being about 0.140 inches. Again, as with bed 12, to avoid an accumulation of smaller particles at the surface of bed 11, the granular size must be fairly uniform. The specific gravity of the material must not be less than 0.9 and not greater than 1.6. It must be comprised of a tough, relilient material to withstand the turbulent slurrying action during the backwash cycle. In the preferred embodiment filter media 11 consists of glass filled polyethylene or polypropylene spherical or cylindrical beads; though polyvinyl chloride and crushed Black Walnut shells are also satisfactory. Unfilled polyethylene or polypropylene also are satisfactory. Though these materials have a specific gravity of less than water, the dynamic pressure created during filtration will cause the upper bed to assume a fixed position against lower filter media 12.

As will be explained in more detail, during the backwash cycle, the upper filter media 11 will be expanded and slurried through a recirculating path which is partly external of vessel 10, while the lower filter media bed 12 will be expanded only. The unfilled head space 13 in the tank 10 above the upper bed 11 must be of sufficient volume to permit adequate slurrying of filter bed 11 in addition to expansion of filter bed 12.

During the filtration cycle, the present invention operates as would any conventional deep bed filter. The dirty liquid 14, contaminated with particulate matter, is pumped from its source 15 through line 16, valve V–1, and line 17 into vessel 10, liquid 14 is distributed by means of splash plate 19 and passes through filter media 11 and 12 which entrap at least part of the particulate contaminants.

The filtered liquid, designated 20, passes into perforate tube 21, which in preferred embodiment is standard slotted wedgewire well screen pipe. Filtered liquid 20 then passes into and through lines 22, 23 and valve V–4, and finally into tank 24 from which filtered liquid will be distributed for later use or use in backwashing filter media 11 and 12. Throughout the filtration cycle valves V–2, V–3, V–5, and V–6 remain closed.

The composition of liquid 14 would in most instances be best represented by municipal or industrial waste water containing greases, oils, flakes, hydroxide, pulp, hair, fibrous and lint-like surface loading contaminants. And in such instances, the dual media composition of the present invention is necessary to ensure removal of surface loading contaminants prior to contact of the contaminated liquid with relatively fine filter media 12. The relatively large size or coarseness of the granules of filter bed 11 allows surface loading contaminants to penetrate the surface of bed 11 to become entrapped between the granules. In the absence of filter media 11, any surface loading contaminants would quickly blind off the surface or filter media 12 and prevent effective in-depth filtration and would require frequent backwashings, yielding an overall inefficient operation.

The backwash cycle is initiated after the filtration cycle upon either a predetermined pressure differential across the filter media bed or upon a preset level of turbidity in filtered liquid 20, or it may be based simply on passage of time or total filtered flow. In any event, upon initiation of the backwash cycle, valves V–1, V–3, and V–4 are closed, and pump 18 is stopped. Valves V–2, V–5 and V–6 are opened and pumps 25 and 26 are started.

The filter beds of conventional mixed-media deep bed filters are backwashed in a manner which provides only an expansion of the beds and a relatively slight agitation to dislodge entrapped dirt particles. This backwashing technique is adequate for cleansing a bed of finer media of its non-surfacing loading contaminants. But proper and more complete separation of surface loading contaminants from the more coarse filter media requires violent agitation and complete slurrying of the filter media. This is particularly necessary for greases, oils and fibrous contaminants, which tend to strongly adhere to the filter media.

The backwash flow rate of filtered liquid 20 through filter media bed 12 is sufficient to expand the dense, lower filter media bed 12 to allow entrapped solids to remove themselves from the interstices of the filter bed. Generally, this would be at an upflow rate of 10 to 15 gallons per minute per square foot of horizontal filter bed area. The expansion of bed 12 and cleansing action of the backwashing filtered liquid 20 flushes contaminants upwardly toward and into the upper bed 11. These contaminants, but not lower filter media bed 12, are then slurried and removed jointly with the contaminants in the upper bed 12, as hereafter described.

During the backwash cycle, filter media bed 11 is expanded and slurried through a path which produces turbulent agitation. This turbulent agitation is a critical part of the present invention and is the basis for requiring the composition of filter media bed 11 to be of a tough and resilient material such as glass filled polyethylene or polypropylene. The turbulent action is necessary to ensure separation of surface loading contaminants from the granules of filter media 11.

At the outset of the backwash cycle, filter media bed 11, the contaminants therein, and the contaminants flushed upwardly from bed 12 are expanded and recirculated through a recirculation path which does not intersect expanded bed 12. The media, suspended in backwash liquid, flows through lines 17 and 27, valve V–2, draw-off device 28, valve V–6, line 29, pump 26 and back into vessel 10, while contaminants are drawn off at draw-off device 28 located in the recirculation path. The turbulent flow produced through the lines external of vessel 10 produce sufficiently violent action to adequately cleanse the filter media bed 11 of the contaminants, including greases, oils, hydroxides, fibers, lint, particulate particles, and the like.

After a period of time has elapsed permitting bed 11 to sufficiently agitate, valve V–3 is opened. With pump 25 having been started, there is a flow of filtered liquid 20 through line 30, valve V–5, line 22, perforate tube 21 and into filter media 12. An equal amount of flow of backwash liquid 32 is withdrawn from the tank 10 through lines 17 and 27, and passes through perforate tube 31 into draw-off device 28 and through line 33 into tank 34 for disposal or further treatment. Backwash liquid 32 contains a concentration of particulate contaminants which have been cleansed from the filter bed. A detailed explanation of draw-off device 28 can be found in my U.S. Pat. No. 3,550,774.

Figure 2:
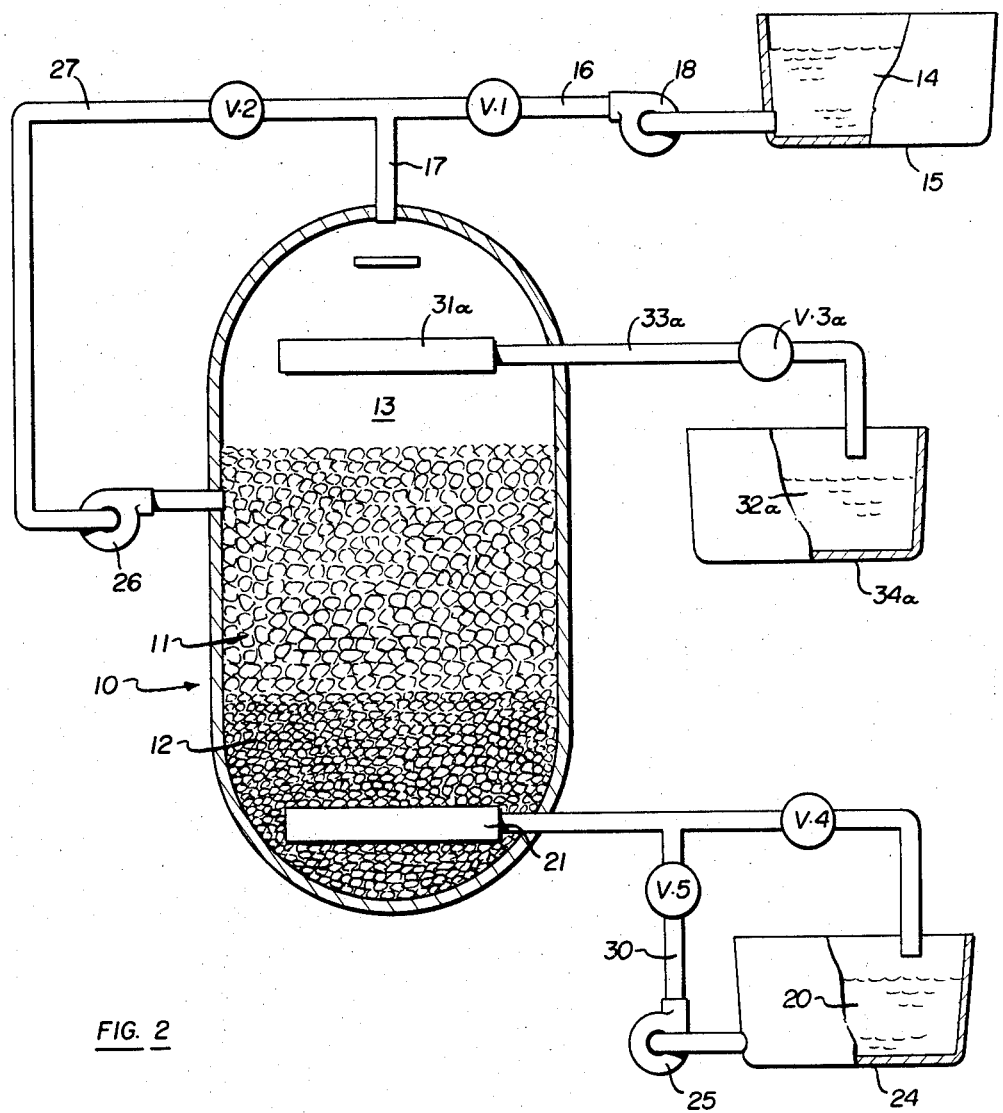
FIG. 2 is a view similar to FIG. 1 of a modified filter of the present invention utilizing a different backwash draw-off device.

The draw-off device shown in FIG. 1 is the type preferred for operation of the present invention. However, a different form of draw-off device is utilized in the embodiment of FIG. 2. As shown in FIG. 2, the perforate tube 31A may be a slotted tube, wedgewire well screen, or similar perforate device. The tube 31A is disposed in the head space 13, and the slurry being recirculated through lines 17, 27 and valve V–2 by pump 26, flows past the tube 31A at which separation occurs. During the backwash cycle, as upon the opening of valve V–3 as shown in FIG. 1, valve V–3A is opened causing backwash liquid 32A to be drawn through line 33A into tank 34A for further treatment or disposal. In all other respects the device shown in FIG. 2 and the operation of the FIG. 2 embodiment is identical to that shown in FIG. 1.

The backwash cycle of each embodiment is continued until sufficient entrapped particulate contaminants have been removed from the filter media. Upon terminating the backwash cycle, pumps 25 and 26 are stopped and valves V-2, V-3, V-5 and V-6 are closed. The granules of filter media then immediately settle into their respective positions as beds 11 and 12. A distinct separation or classification of the two different filter media takes place as a result of the different specific gravities of the filter materials. The heavier and finer filter media will settle first followed by less rapid settlings of the coarser material. The fact that filter beds 11 and 12 do not intermix during the backwashing cycle also aids in maintenance of distinctly separate beds. If bed 11 is composed of lighter than water material such as unfilled polyethylene or polypropylene, bed 11 will float until filtration flow is again resumed, thus maintaining an obvious separation of filter beds.

After the backwashing cycle, it may be desirable to purge backwash device 28 and lines 17, 27 and 29 of filter media. Such a purge is not a part of the present invention, and for the sake of simplification, piping and other appurtenances necessary to carry out the purge are not shown.

The sequence of operation of the present invention is shown in the simplified schematics of FIGS. 3 and 4. In FIG. 3, operation of the filtration cycle is depicted with the arrows showing the flow path of the contaminated liquid through the filter media beds. The backwash cycle with expansion of filter media bed 12 and slurrying of filter media bed 11 is shown in FIG. 4, again with arrows indicating the respective flow paths.

The foregoing disclosure dealt with a pressure filter vessel which is the preferred embodiment of the present invention because of the greater filtration flow rates developed with pressure filtration. However, it should be understood that the present invention is applicable equally as well to standard gravity filters.

Having fully explained an operative embodiment of the present invention, I now claim:

1. In a method of operating and regenerating a filter, said filter including a vessel having an inlet in an upper portion and an outlet in a lower portion thereof, a lower layer of filter media consisting essentially of granular material of a substantially uniform specific gravity greater than about 2.1, an upper layer of filter media in direct contact with said lower layer and consisting essentially of a durable, resilient granular material of a substantially uniform specific gravity in the range of about 0.9 to 1.6 and in a size range of about 0.050 to 0.375 inches, the granular materials of said upper and lower layers being selected so that the layers remain essentially discrete after backwashing, and said upper layer granular material being resilient and durable to maintain its granular size and integrity upon backwashing, a circulation means including (a) a conduit exterior to and communicating with said vessel at first and second locations, said first location being generally at an upper portion of said vessel above said upper filter media and said second location being generally at the side of the vessel between the upper and lower surfaces of the upper filter media during backwashing, (b) a draw-off device, and separating means in said device for removing contaminants and a portion of the backwash liquid from the slurry being circulated through said circulation means, and (c) a pump in said circulation conduit, comprising the steps of: (1) flowing contaminated liquid into said vessel inlet, and through the upper and lower filter layers to remove at least a portion of the contaminants; (2) removing the filtered liquid through said outlet; (3) terminating said flow when at least one of said filter layers becomes at least partially clogged with particulate contaminants; (4) introducing backwash liquid into a lower portion of said filter vessel at a flow rate (a) sufficient to expand the lower filter media layer and flush at least some of the accumulated contaminants therein upwardly into the upper media layer, and (b) the backwash flow rate being insufficient either to intermix the lower media layer with the upper media layer or to expand said lower media to said second location; (5) energizing the circulation pump to assist in forming a slurry comprised of the upper media layer, the contaminants accumulated in said upper layer, and the contaminants flushed upwardly from said lower media layer; (6) flowing said slurry (a) out of the vessel through said first location, and (b) through said circulation means, separating at least a portion of said contaminants from said slurry in said separating means to at least partially cleanse said slurry; (7) flowing the cleansed slurry back into said vessel through the second location to further assist in slurrying and circulating the upper layer and any contaminants; and (8) terminating said slurry circulation flow and the introduction of said backwash flow and reforming said upper and lower media layers.

* * * * *